United States Patent
Silva et al.

(10) Patent No.: US 10,733,740 B2
(45) Date of Patent: Aug. 4, 2020

(54) RECOGNITION OF CHANGES IN A DETECTION ZONE

(71) Applicant: SICK AG, Waldkirch (DE)

(72) Inventors: Jens Silva, Waldkirch (DE); Uwe Hahne, Waldkirch (DE)

(73) Assignee: SICK AG, Waldkirch (DE)

( * ) Notice: Subject to any disclaimer, the term of this patent is extended or adjusted under 35 U.S.C. 154(b) by 148 days.

(21) Appl. No.: 16/198,213

(22) Filed: Nov. 21, 2018

(65) Prior Publication Data

US 2019/0180453 A1 Jun. 13, 2019

(30) Foreign Application Priority Data

Dec. 12, 2017 (DE) .................. 10 2017 129 609

(51) Int. Cl.
*G06T 7/246* (2017.01)
*G06T 7/254* (2017.01)
*G01B 11/25* (2006.01)

(52) U.S. Cl.
CPC .............. *G06T 7/248* (2017.01); *G01B 11/25* (2013.01); *G01B 11/2545* (2013.01); *G06T 7/254* (2017.01); *G06T 2207/10016* (2013.01); *G06T 2207/10021* (2013.01); *G06T 2207/10028* (2013.01); *G06T 2207/20021* (2013.01); *G06T 2207/20076* (2013.01); *G06T 2207/20081* (2013.01); *G06T 2207/30232* (2013.01)

(58) Field of Classification Search
CPC . G06T 2207/10021; G06T 2207/10028; G06T 2207/20021; G06T 2207/20081; G06T 7/248

See application file for complete search history.

(56) References Cited

U.S. PATENT DOCUMENTS

| | | | | |
|---|---|---|---|---|
| 5,930,383 A | * | 7/1999 | Netzer | G01C 11/02 382/106 |
| 2013/0094705 A1 | * | 4/2013 | Tyagi | F16P 3/144 382/103 |
| 2017/0228602 A1 | * | 8/2017 | Stefanovic | G01B 11/0608 |

(Continued)

FOREIGN PATENT DOCUMENTS

| DE | 10138960 A1 | 2/2003 |
|---|---|---|
| DE | 102016201741 A1 | 8/2017 |

OTHER PUBLICATIONS

Office Action dated Sep. 6, 2018 issued in corresponding German Application No. 10 2017 129 609.3.

(Continued)

*Primary Examiner* — David Bilodeau
(74) *Attorney, Agent, or Firm* — Nath, Goldberg & Meyer; Jerald L. Meyer

(57) ABSTRACT

A method of recognizing changes in a detection zone is provided in which three-dimensional image data of the detection zone are detected and evaluated to recognize changes with reference to three-dimensional reference image data. The detection zone is divided into cells in this process. Reference limit values at which heights objects are recognized are determined in a teaching phase. In an operating phase, a maximum value and/or a minimal value of the heights of currently recognized objects is/are determined from the respective detected image data and a change is recognized on a deviation with respect to the reference limit values.

10 Claims, 3 Drawing Sheets

(56) References Cited

U.S. PATENT DOCUMENTS

Figure 1:
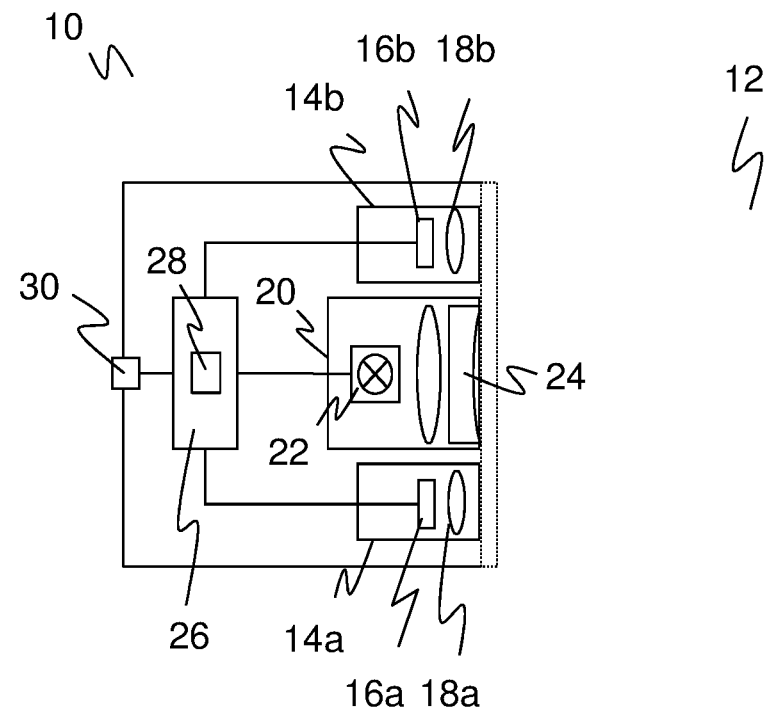

2018/0005417 A1* 1/2018 Schieke .................... G06T 7/30
2018/0304468 A1* 10/2018 Holz .................... G05D 1/0225
2019/0130590 A1* 5/2019 Volochniuk .......... G06K 9/2063

OTHER PUBLICATIONS

Arif, et al., Tracking and Classifying Objects on a Conveyor Belt Using Time-of-Flight Camera, 27th International Symposium on Automation and Robotics in Construction (ISARC 2010), pp. 203-212.

Bevilacqua, et al., "People Tracking Using a Time-of-Flight Depth Sensor", Video and Signal Based Surveillance, 2006. AVSS '06, IEEE International Conferences, IEEE, 2006.

Underwood, et al., "Explicit 3D Change Detection using Ray-Tracing in Spherical Coordinates", 2013 IEEE International Conference on Robotics and Automation (ICRA), pp. 4735-4741.

Radke, et al, "Image Change Detection Algorithms: A Systematic Survey", IEEE Transactions on Image Processing, vol. 14, No. 3, pp. 294-307, Mar. 2005.

Aijazi, et al., "Detecting and Updating Changes in Lidar Point Clouds for Automatic 3D Urban Cartography", ISPRS Annals of Photogramm, Remote Sensing and Spatial Information Sciences, vol. II-5/W2, 2013, ISPRS Workshop Laser Scanning, Nov. 2013.

\* cited by examiner

RECOGNITION OF CHANGES IN A DETECTION ZONE

The invention relates to a method of recognizing changes in a detection zone of three-dimensional image data in which three-dimensional image data of the detection zone are detected and the three-dimensional image data are evaluated to recognize the changes with reference to three-dimensional reference image data.

Unlike a conventional camera, a 3D camera also takes depth information and thus generates three-dimensional image data having spacing values or distance values for the individual pixels of the 3D image which is also called a distance image or a depth map. The additional distance dimension can be utilized in a number of applications to obtain more information on objects in the scene detected by the camera and thus to satisfy different objects in the area of industrial sensor systems.

Different processes are known for determining the depth information such as time of flight measurements, interferometry, or triangulation. Light section processes, projection processes, and stereoscopy can in turn be distinguished under the triangulation processes. In the light section process, the object is moved beneath the sensor and a 3D point cloud is generated from the acquired stripe-based depth information. In the projection process, for example, a stripe pattern is projected onto the surface to be scanned and depth information is derived from changes of the pattern by the objects in the scene. Alternatively, a so-called self-dissimilar, that is spatially unambiguous, pattern, is projected. Stereoscopic processes are based on stereoscopic vision with two eyes and search mutually associated picture elements in two images taken from different perspectives; the distance is estimated by triangulation from the disparity of said picture elements with knowledge of the optical parameters of the stereoscopic camera.

In a number of applications, an aim of the evaluation of the three-dimensional image data is whether something has changed in the scene, that is, for example, whether an object has been added, has in particular moved to a specific location or at a specific distance or has disappeared from the scene.

A conventional approach in accordance with A. K. Aijazi et al., "Detecting and updating changes in lidar point clouds for automatic 3D urban cartography", ISPRS Annals of the Photogramm, Remote Sens Spat Int Sci II (5/W2), 2013, p. 7-12 distinguishes between permanent and temporary objects in a 3D point cloud. The temporary objects are then cut out and the gaps that are produced are filled with permanent objects from a different point in time. A complex object segmentation on a voxel grid takes place for the classification of temporary objects and the further processing also requires a 3D voxel grid.

According to the paper by R. J. Radke et al., "Image change detection algorithms: a systematic survey", IEEE transactions on image processing, 2005, 14th Vol., No. 3, p. 294-307, there are various proposals for the detection of changes, including significance tests, hypotheses tests, prediction models, and background models. However, this is all based on two-dimensional image data, i.e. on an intensity evaluation. Changes that relate only to the three-dimensional position are not reliably recognized by this.

J. P. Underwood et al., "Explicit 3D change detection using ray-tracing in spherical coordinates" in: 2013 IEEE International Conference on Robotics and Automation (ICRA), p. 4735-4741 evaluates proximity relationships, can recognize changes with any time interval, and can distinguish between changes in the scene and assumed changes. The processing effort for the point-by-point evaluation is very high, however.

It is therefore the object of the invention to provide an improved recognition of changes from three-dimensional image data.

This object is satisfied by a method of recognizing changes in a detection zone and by a 3D sensor that uses the method in accordance with the respective independent claim. Three-dimensional image data are detected, for example in the form of a depth map or of a 3D point cloud, and changes are recognized by a comparison with three-dimensional reference image data. However, this does not mean that the comparison takes place at the level of the image data themselves, respective information is rather acquired from the image data and from the reference image data and this information is then compared.

The invention now starts from the basic idea of forming cells in the detection zone, of assigning expected properties to these cells from the reference image data in a teaching phase, and of recognizing changes in the scene in an operating phase in the detection zone by a difference from the expected properties. A two-dimensional area is defined in the detection zone. It is divided into cells, in particular by a grid having rectangular cells. The cells additionally have a height perpendicular to the two-dimensional area and are thus three-dimensional part regions. Two respective reference limit values as to the height at which objects are located there are determined for the respective cells during the teaching phase. They are accordingly the lowest and highest values of the three-dimensional image data in the cell, relative to the vertical direction perpendicular to the two-dimensional area. In an operating phase, a maximum value and a minimal value where objects are currently located in the respective cell are correspondingly determined from the respective currently detected image data. If the maximum value or the minimal value break out of the frame formed by the associated reference limit value, a change of the scene has resulted that is also localized by the respective cell.

The invention has the advantage that it can be reliably recognized with relatively little effort whether and where a three-dimensionally detected scene has changed between two points in time. The cells moreover permit a simple configuration as to the parts of the scene in which changes should be recognized and where they should be ignored. Overall, detection zones having a depth of a plurality of meters can also thereby be processed without the effort increasing, as would be the case with conventional 3D grid approaches or voxel approaches.

The detection zone is preferably restricted by a configuration. The three-dimensional image data detected or detected overall are accordingly only evaluated for changes in a partial region (VOI, volume of interest). Non-relevant changes outside the configured part region are ignored. This not only reduces the evaluation effort, but also allows only changes to be recognized in a targeted manner that can actually play a role for the respective application.

The reference limit values are preferably determined as mean values over a plurality of detections of three-dimensional reference image data. Care is preferably taken in this respect that there are for so long no changes in the scene that should be later detected. The scene can therefore be considered quasi static during the teaching phase or dynamics are actually present, but in a manner that should later be considered normal and should not be reported as a change. Averaging takes place over fluctuations so that random, and possibly selective, tolerance effects do not set reference limit values not suitable for the operation. The reference limit values can be averaged not only in time, but also locally. For this purpose, a mean value of a group of lowest or highest image points of the reference image data of a cell is also determined within a single detection of three-dimensional reference image data. It is avoided by the averaging that a single local outlier determines the contribution of the respective detected reference image data of this cell to the reference limit vales. Instead, in accordance with this embodiment, a mean vale is formed, for example, from a group of the $n \leq 10$ lowest or highest image points. Time averaging preferably additionally takes place over the respective local mean values and the respective reference limit value is only thus formed. Another possibility of dealing with outliers is to determine the respective $k \leq 3$ lowest or highest image points and to work with the kth maximum or minimum.

A standard deviation is preferably determined with respect to the reference limit values. Together with the time averaging over a plurality of detections of three-dimensional reference image data, an associated measure is thus simultaneously detected with the respective reference value as to how far apart the individual image points are that define a reference limit value. Although the mathematical definition is first meant by standard deviation, the term should additionally also cover other statistical measures with which a scattering is described, in particular the variance.

A change in a cell is preferably recognized when the maximum value differs by more than a multiple of the standard deviation from the upper reference limit value and/or if the minimal value differs by more than a multiple of the standard deviation from the lower reference limit value. It was detected via the standard deviation how much change occurs due to effects such as noise and other tolerances in the scene still considered the scene during teaching or which dynamics by objects are to be considered normal. A change actually to be detected during the operating phase should be distinguished from such fluctuations. A multiple of the standard deviation is fixed as the minimum deviation for this purpose. It can be determined via the specific multiple whether errors of a first kind or of a second kind should rather be avoided and the relationship of sensitivity to false alarms can thus be set. An exemplary multiple of three provides a more than 99% probability that a recognized change is not due to statistical fluctuations. Other confidence intervals are equally conceivable.

The maximum value and/or minimal value is/are preferably determined as a mean value or as a representative of a group of lowest or highest image points of the detected image data of a cell. This forms a kind of filter of the operating phase against single local outliers in that averaging is carried out, for example, via groups with the $n \leq 10$ lowest or highest image points. Alternatively, a representative of this group can be selected, for example only the $k \leq 3$ lowest or highest image point or the median. For the same purpose of intercepting outliers, it would also be conceivable to demand a change over a plurality of detections of three-dimensional image data before it is considered an actual change or to average temporally over the plurality of detections.

The two-dimensional area is preferably aligned at a base surface of the detection zone. This in particular means that the two-dimensional area is defined within the base surface or, with largely the same meaning, in a two-dimensional area in parallel with the base surface. The base surface can, for example in a three-dimensional detection from above, be formed by the floor, but depending on the perspective also by a wall, the ceiling, or a purely virtual boundary of the detection zone. The base surface is preferably transverse or even perpendicular to the optical axis of the three-dimensional detection.

The division of the two-dimensional area into cells is preferably configured. An easily manageable configuration only determines parameters of a regular, in particular rectangular, grid, that is in particular the size of the grid, the size of the individual cells, and their number, with these parameters naturally depending on one another in part. It is, however, also conceivable to specify cells in even more detail that are then no longer the same among one another up to an individual configuration of cells.

A vertical region of the cells is preferably configured within which changes are recognized. This configuration can be different for all cells together, but also for groups of cells, or even for individual cells. The cells so-to-say have a cell bottom and a cell top and changes below or above are no longer considered relevant. It can thereby be specified which changes are to be observed, and indeed even with spatial resolution over the individual cells. Movements of objects close to the floor can, for example, be masked in that the cell bottom is fixed at a certain distance from the floor.

A 3D sensor in accordance with the invention for the detection of three-dimensional image data in a detection zone has a control and evaluation unit that is configured for one of the explained embodiments of the method of recognizing changes. Examples for such 3D sensors include 3D cameras having at least one image sensor, for instance a time of flight camera, a 3D camera with a projection process, or a stereoscopic camera. Another example is a laser scanner having a distance measurement and a scanning mechanism in two axes.

Figure 2:
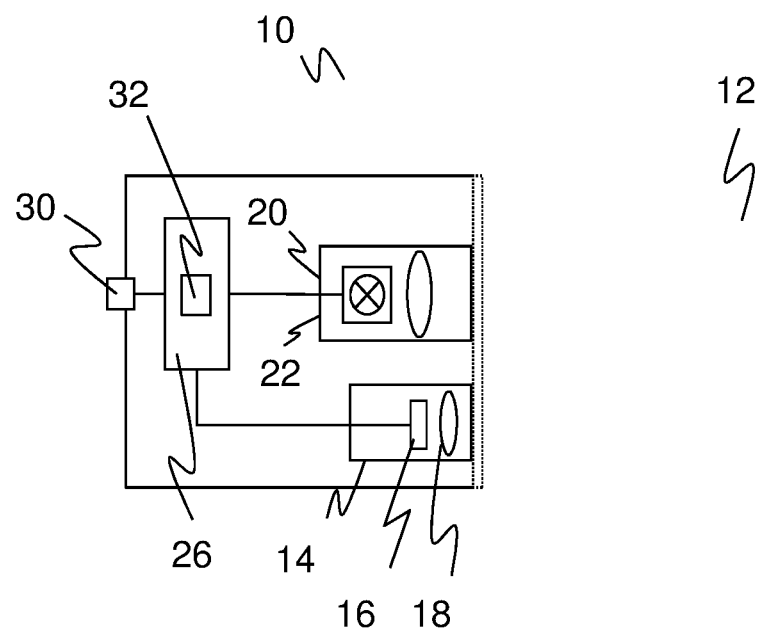
Figure 3:
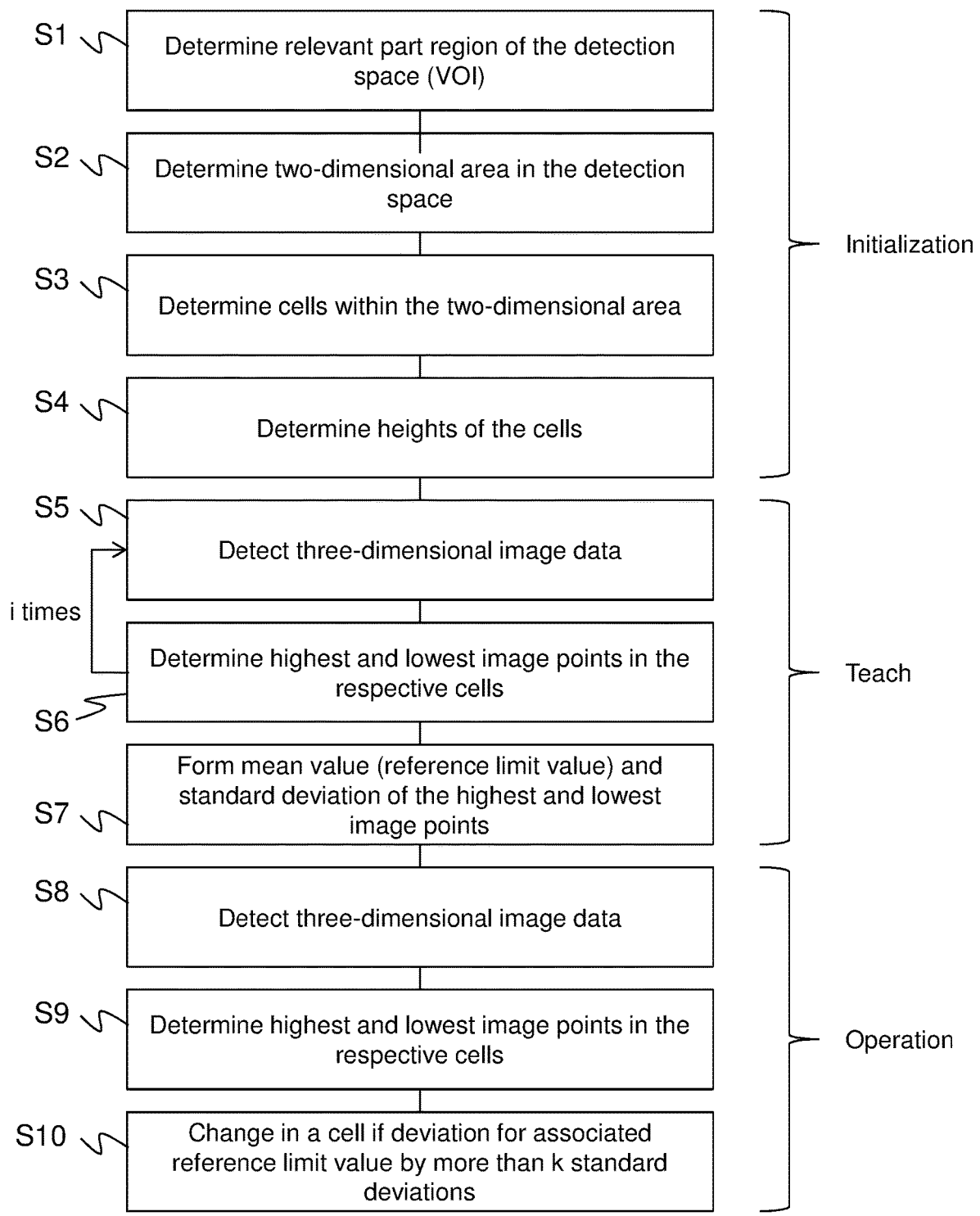
Figure 4:
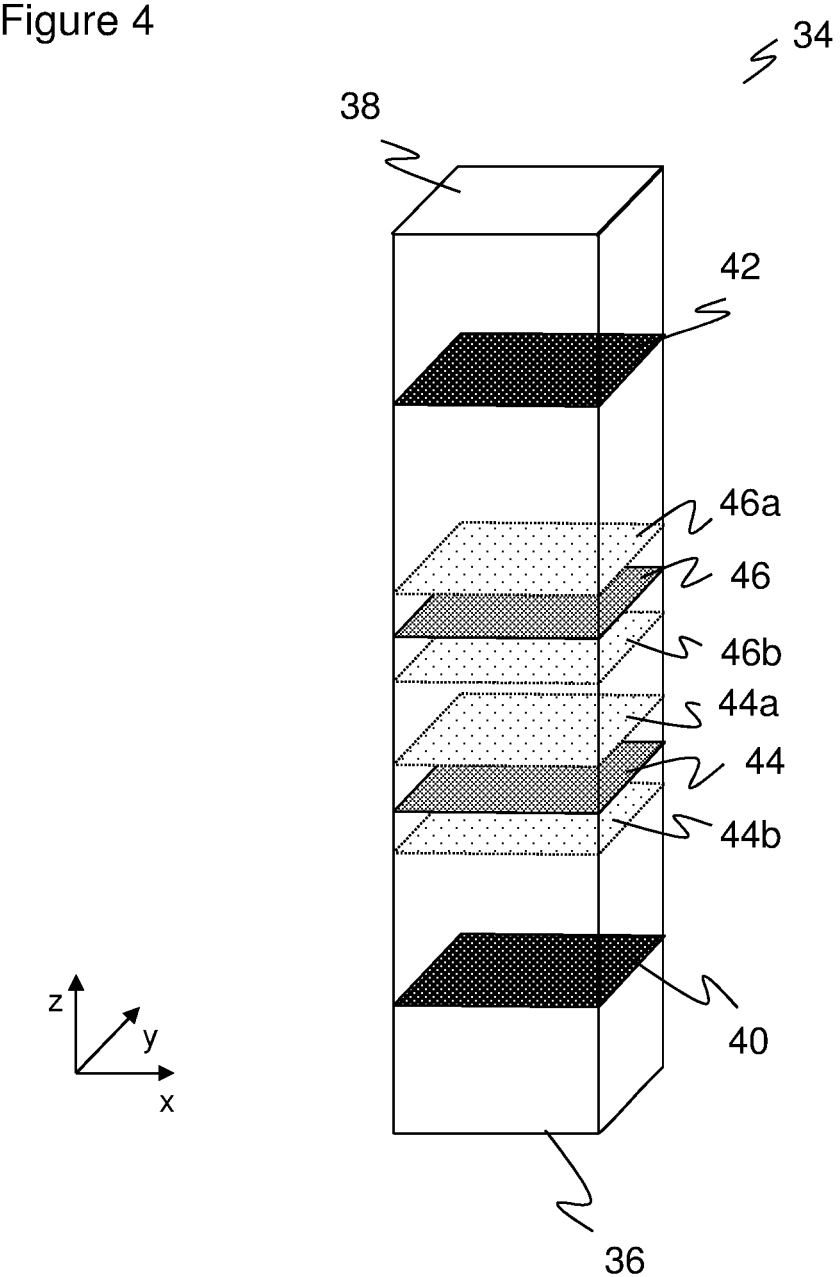

The invention will be explained in more detail in the following also with respect to further features and advantages by way of example with reference to embodiments and to the enclosed drawing. The Figures of the drawing show in:

FIG. 1 a schematic block diagram of a 3D sensor that is configured as a stereoscopic camera;

FIG. 2 a schematic block diagram of a 3D sensor that is configured as a time of flight camera;

FIG. 3 an exemplary flowchart for recognizing changes of a scene from three-dimensional image data; and FIG. 4 a schematic representation of a cell in the detection zone of a 3D sensor for explaining different values for detecting changes within the cell.

FIG. 1 shows a schematic representation of a 3D sensor 10 for recording three-dimensional images of a detection zone 12 in an embodiment as a stereoscopic camera. The 3D sensor 10 can be installed at a production cell or at an elevator for monitoring, for example. An advantageous perspective is the monitoring from above and the terms of this description often correspond to this idea. A different perspective is, however, equally possible, for instance a 3D sensor 10 laterally directed to a shelf where then terms such as the bottom or the height are to be replaced with the rear wall of the shelf and the distance from this rear wall. A mobile use of the 3D sensor 10 with a changing perspective, for instance for a driver assisted system or even for autonomous driving (AGV, automated guide vehicle) is equally not precluded.

Two camera modules 14*a-b* are mounted at a known fixed spacing from one another in the 3D sensor 10 and each take images of the detection zone 12. An image sensor 16*a-b*, typically a matrix-type imaging chip, for example a CCD or a CMOS sensor, is provided in each camera and takes a rectangular pixel image. A respective objective having an imaging optics is associated with the image sensors 16*a-b*; it is shown as a lens 18*a-b* and can in practice be realized as any known imaging optics.

An illumination unit 20 having a light source 22 is shown in the center between the two camera modules 14*a-b*, with this spatial arrangement only to be understood as an example. Contrary to the representation, the illumination unit 20 can also be arranged differently and also externally. It would even be possible to dispense with the illumination unit 20 for passive stereoscopy. The lighting unit 20 generates a structured lighting pattern in the detection zone 12 with the aid of a pattern generation element 24. The lighting pattern should preferably be unambiguous or self-dissimilar at least locally in the sense that structures of the lighting pattern do not result in spurious correlations or clearly mark an illumination zone.

A combined control and evaluation unit 26, that is only called an evaluation unit 26 in the following, is connected to the two image sensors 16*a-b* and to the illumination unit 20. The structured lighting pattern is produced by means of the evaluation unit 26 and it receives image data of the image sensors 16*a-b*. A stereoscopic unit 28 of the evaluation unit 26 calculates three-dimensional image data of the detection zone 12 using a stereoscopic algorithm known per se by the search for corresponding image features in the two images of the image sensors 16*a-b*, determination of their spacing, called disparity, and conversion into a distance using the known geometry in the 3D sensor 10. The evaluation unit 26 and the stereoscopic unit 28 can be implemented, differently from the representation, in any desired manner distributed over one or more digital modules and can also have analog circuit parts.

The 3D sensor 10 can output three-dimensional images or other measurement results via an output 30, for example evaluation results such as the recognition of changes of the scene in the detection zone 12 still to be explained with reference to FIGS. 3 and 4.

FIG. 2 shows in a further block diagram an alternative embodiment of the 3D sensor 10 as a time of flight camera. In this respect, here and in the following, the same reference numerals designate features which are the same or which correspond to one another. Over the relatively rough plane of the representation, the time of flight camera mainly differs from a stereo camera by the lack of a second camera module. In addition, the pattern generation element 24 is dispensed with and the detection zone 12 is illuminated as a whole. Instead of the stereoscopic unit 28, a time of flight unit 32 is provided in the evaluation unit 26 which measures the time of flight between the transmission and reception of a light signal. Pulses or a periodic pattern are superposed on the light signals so that the time of flight can be measured via a phase process or a pulse process. The time of flight unit 32 can also be at least partly directly integrated into the image sensor 16, for example in a PMD chip (photon multiplicity detection).

The design shown in FIG. 2 is also that of a 3D camera that estimates distances in a projection process from distance-dependent changes of the illumination pattern, with then the pattern generation element 24 naturally again having to be added and a corresponding evaluation having to be provided since the distance estimation is here based on correlation of a detected two-dimensional image with the illumination pattern. The explained examples for 3D sensors are not exclusive. 3D scanners are, for example, also known that sequentially determine distances from the scanned object points with their scanning beam, with the scanning beam being periodically moved in two axes.

FIG. 3 shows an exemplary flowchart for recognizing changes of a three-dimensional scene in the detection zone 12 from three-dimensional image data of the 3D sensor. This recognition can be implemented in the control and evaluation unit 26, but also at least partly externally. The routine is roughly divided into an initialization phase, a teaching phase, and an operating phase. This can in summary be understood as a kind of Shewhart control that is applied to upper and lower mean values for expected detection levels of objects in the detection zone 12 divided into cells.

At the start of the initialization, a relevant three-dimensional part region of the detection zone 12 that is called a volume of interest (VOI) is configured in a step S1. The VOI preferably has a parallelepiped-shaped geometry. The bottom and top surfaces of the VOI is preferably in parallel with a base surface, for instance the floor of the scene. If the user does not specify any VOI, the total detection zone 12 or a bounding box is used, for example, for all the three-dimensional image data of a test detection so that the VOI then includes the whole 3D point cloud.

In a step S2, a two-dimensional area is defined within the detection zone 12. It serves as a reference plane with respect to which the distances or heights are measured and preferably forms a Z=0 plane. Together with an X axis and a Y axis within the two-dimensional area, an advantageous coordinate system is then present that is, however, naturally only a convention and could also be selected differently. Provision is made by an installation of the 3D sensor that the selected two-dimensional area also represents the desired actual location in the scene, for example a floor of a monitored robot cell or a rear wall of a shelf. The two steps S1 and S2 are also interchangeable; a reference plane and a coordinate system are then first fixed and a VOI is then defined therein.

In a step S3, the two-dimensional area or an area in parallel therewith within the VOI is divided into initially two-dimensional cells. The cells preferably form a rectangular grid. Its parameters, that is the side lengths of the cells or the number of cells in the X direction and Y direction can be predefined or configured. Alternatively to a regular grid, it is also conceivable to combine cells or even to determine cell sizes or cell geometries individually. Such regions can also be formed downstream from a regular grid of cells.

The two-dimensional cells become three-dimensional cells in a step S4 by fixing heights. In this respect, two heights can be defined, namely the height of the cell itself and its vertical position with respect to the Z=0 plane. The separate definition of cells in steps S3 and S4 into first two dimensions and then three dimensions primarily serves for explanation; it is also conceivable to fix three-dimensional cells directly.

FIG. 4 shows a schematic representation of such a three-dimensional cell 34 to illustrate its initialization. This representation will be made use of a plurality of times in the following to illustrate values for fixing a change of the scene within the cell 34. Care should be taken that the VOI is located within the detection zone 12 that is a truncated pyramid due to the central perspective of the 3D sensor.

The base surface of the cell 34 is predefined in step S3 by the grid within the two-dimensional area. The vertical location of the VOI with respect to the Z=0 plane and the height of the VOI serve as initial vertical values. The maximum configuration range of the cell 34 between the shown cell bottom 36 and the cell top 38 also results therefrom. The user can optionally displace these heights per cell 34 or for all cells together to a configured cell bottom 40 and to a configured cell top 42. Changes of the scene below the configured cell bottom 40 and above the configured cell top 42 are later ignored.

The user obtains a flexible adaptation possibility by the division into cells 34 and by the fixing of a configured cell bottom 40 and a configured cell top 42. Regions of the detection zone 12 are thereby directly excluded in which dynamic events are tolerated and are not recognized as changes.

The teaching phase can now begin with this initialization. In a step S5, three-dimensional image data of the detection zone 12 are detected by the 3D sensor 10 as three-dimensional reference image data, for example in the form of a depth map or of a 3D point cloud.

In a step S6, the Z value of the highest and lowest image points are determined per cell 34 under the condition that the Z values are disposed between the configured cell bottom 40 and the configured cell top 42. Optionally, the n 10 highest and lowest image points are determined and averaged thereby to intercept isolated outliers that probably do not correspond to any real object. Another possibility of handling such outliers is to determine the k 3 and also the k 10 highest and lowest image points and to use the lowest or highest image point, that is ultimately the k highest or k lowest image point. Other representatives such as the median of such a group are also conceivable.

The steps S5 and S6 are repeated i times with preferably sequential frames of the 3D sensor 10 and with a respective new set of three-dimensional reference image data, for example i=50, with this number also being able to be configurable. During these repetitions, only changes should take place in the scene that are lateral tolerated in operation.

In a step S7, a respective mean value is formed per cell 34 from the maxima and minima of Z found in the respective repetitions. This corresponds to a temporal averaging over the repetitions. The mean value of the minima defines a lower reference limit value 44, the mean value of the maxima corresponding to an upper reference limit value 46 of the cell 34. Optionally, the individual minima and maxima were already not absolute minima and maxima, but rather the result of evaluation of a group of lowest and highest image points such as step S6.

In addition, a standard deviation is also determined for the reference limit values 44, 46 formed by a mean value. A respective height corridor 44a-b, 46a-b about the reference limit values 44, 46 is defined by a multiple of the standard deviation. If a cell 34 does not contain any image points, the reference limit values 44, 46 are, for example, set to the configured cell bottom 40 or to the configured cell top 42 and the standard deviations are set to zero. It must still be noted that it is not absolutely necessary to buffer the respective maxima and minima of the cells in the individual runs of steps S5 and S6, but rather mean values and standard deviations can also be formed continuously, for example via sums and auxiliary values from quadratic sums.

The system can then move into the operating phase with the taught values. Current three-dimensional image data are respectively detected at the run time by the 3D sensor 10 in a step S8.

In a step S9, the lowest and highest image points per cell 34 are determined. In this respect, image points having vertical values below the configured cell bottom 40 and above the configured cell top 42 are ignored, for instance by corresponding cropping of the 3D point cloud. It is optionally conceivable to make an average over a group of n 10 highest or lowest image points to use the k 3 highest or lowest image point or another representative such as has analogously been explained with respect to step S6. If no distance was determined for a cell 34 or the 3D point cloud restricted thereto does not include any elements, the minimal value and the maximum value can thus be set to the configured cell bottom 40 or to the configured cell top 42. The determination of a maximum value and of a minimal value per cell in step S9 largely corresponds to step S6, only that now work is carried out with current image data and the results are subsequently used differently.

In a step S10, the minimal values and maximum values per cell acquired from the current three-dimensional image data are now compared with the associated reference limit values 44, 46. To only recognize changes to be detected in this process and not to react to fluctuations or to permitted movements known from the teaching phase, the difference has to amount to more than a multiple of the respective detected standard deviation. However, as soon as the minimal value leaves the height corridor 44a-b predefined by the multiple of the standard deviations by the lower reference limit value 44 and/or the maximum value leaves the corresponding height corridor 46a-b by the upper reference limit vale 46, this is evaluated as a change of the scene in the respective cell. It is conceivable to check even further criteria before a change is reported or is reacted to, for instance that it has to be present over a plurality of frames. The multiple of the standard deviation can be adapted to make a choice between sensitivity and reliability of a recognized change. If a cell 34 was empty during the teaching, any desired image point within the cell 34 is sufficient to be recognized as a change if, as proposed above, the reference limit values 44, 46 are fixed at the configured cell bottom 40 and the configured cell top 42 are fixed without a tolerance, that is with a standard deviation of zero.

The steps S8-S10 performed at the run time are now repeated, preferably in each frame, for the operating phase.

The procedure in accordance with the invention makes it possible to adapt the resolution over the grid of the cells 34. In addition, the size and location of the part monitored for changes can be configured via the VOI. Problems due to walls, furniture and the like can thus also be overcome that would dominate or suppress the reference limit values 44, 46 and the fluctuations detected by the standard deviation without an adaptation of the cells. A further example in which adaptable cells are useful is the check of an open box or of a shelf for a changed content where one or more cells 34 are only defined for the respective inner space and thus, as desired, only react to the content and not to the boundaries.

The routine shown in FIG. 3 is only to be understood by way of example. The order of some steps is in particular interchangeable, particularly during the initialization. Some steps are also only optional. The initialization overall or individual steps thereof can thus be fixedly predefined instead of configured by the user. In simpler embodiments, only a single reference image data set is recorded during the teaching or the highest and lowest image points of a cell are used as reference limit values 44, 46 directly and without averaging or determining a standard deviation.

The invention claimed is:

1. A method of recognizing changes in a detection zone, in which three-dimensional image data of the detection zone are detected and the three-dimensional image data are evaluated to recognize the changes with reference to three-dimensional reference image data, wherein a two-dimensional area in the detection zone is divided into cells having a vertical direction perpendicular to the two-dimensional area;

wherein at least one of an upper reference limit value and a lower reference limit value which limits the heights within the respective cell where objects are recognized in the reference image data is determined from the reference image data in a teaching phase for the cells;
wherein at least one of a maximum value and a minimal value of the heights of currently recognized objects are determined in a respective cell in an operating phase from the respective detected image data;
and wherein a change in a cell is recognized when the maximum value there differs from the upper reference limit value and/or when the minimal value differs from the lower reference limit value.

2. The method in accordance with claim 1,
wherein the detection zone is restricted by a configuration.

3. The method in accordance with claim 1,
wherein the reference limit values are determined as mean values over a plurality of detections of three-dimensional reference image data.

4. The method in accordance with claim 3,
wherein a standard deviation is determined with respect to the reference limit values.

5. The method in accordance with claim 4,
wherein a change in a cell is recognized when the maximum value differs by more than a multiple of the standard deviation from the upper reference limit value and/or the minimal value differs by more than a multiple of the standard deviation from the lower reference limit value.

6. The method in accordance with claim 1,
wherein at least one of the maximum value and the minimal value is determined as a mean value or as a representative of a group of lowest or highest image points of the detected image data of a cell.

7. The method in accordance with claim 1,
wherein the two-dimensional area is aligned at a base surface of the detection zone.

8. The method in accordance with claim 1,
wherein the division of the two-dimensional area is configured in cells.

9. The method in accordance with claim 1,
wherein a vertical region of the cells is configured within which changes are recognized.

10. A 3D sensor for detecting three-dimensional image data in a detection zone, wherein the 3D sensor has a control and evaluation unit that is configured to carry out a method of recognizing changes in a detection zone,
in which three-dimensional image data of the detection zone are detected and the three-dimensional image data are evaluated to recognize the changes with reference to three-dimensional reference image data,
wherein a two-dimensional area in the detection zone is divided into cells having a vertical direction perpendicular to the two-dimensional area;
wherein at least one of an upper reference limit value and a lower reference limit value which limits the heights within the respective cell where objects are recognized in the reference image data is determined from the reference image data in a teaching phase for the cells;
wherein at least one of a maximum value and a minimal value of the heights of currently recognized objects are determined in a respective cell in an operating phase from the respective detected image data;
and wherein a change in a cell is recognized when the maximum value there differs from the upper reference limit value and/or when the minimal value differs from the lower reference limit value.

* * * * *

UNITED STATES PATENT AND TRADEMARK OFFICE
CERTIFICATE OF CORRECTION

PATENT NO. : 10,733,740 B2  
APPLICATION NO. : 16/198213  
DATED : August 4, 2020  
INVENTOR(S) : Jens Silva and Uwe Hahne Page 1 of 1

It is certified that error appears in the above-identified patent and that said Letters Patent is hereby corrected as shown below:

On the Title Page

Please delete and replace the Applicant City with the following:  
(71) Applicant: SICK AG, Waldkirch (DE)

Please delete and replace the Second Inventor City with the following:  
(72) Uwe Hahne, Waldkirch (DE)

Signed and Sealed this  
Fifteenth Day of September, 2020

Andrei Iancu  
*Director of the United States Patent and Trademark Office*